United States Patent
Beardsley et al.

(10) Patent No.: US 11,239,934 B2
(45) Date of Patent: Feb. 1, 2022

(54) ROBUST DISTRIBUTION OF IP TIMING SIGNALS

(71) Applicant: Disney Enterprises, Inc., Burbank, CA (US)

(72) Inventors: Craig L. Beardsley, Chicago, IL (US); Jerome G. Liscano, New York, NY (US); Michael J. Strein, Bohemia, NY (US); Carl A. Brown, Deer Park, NY (US); Nishith Shah, Monroe, NJ (US); Benjamin H. Kepler, Palisades, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/518,780

(22) Filed: Jul. 22, 2019

(65) Prior Publication Data
US 2021/0028876 A1    Jan. 28, 2021

(51) Int. Cl.
*H04J 3/06* (2006.01)
*H04N 21/43* (2011.01)
*H04Q 11/00* (2006.01)
*H04N 21/643* (2011.01)
*H04N 21/61* (2011.01)

(52) U.S. Cl.
CPC .......... *H04J 3/0667* (2013.01); *H04J 3/0673* (2013.01); *H04N 21/4305* (2013.01); *H04N 21/6125* (2013.01); *H04N 21/64322* (2013.01); *H04Q 11/0005* (2013.01)

(58) Field of Classification Search
CPC ...... H04J 3/0641; H04J 3/0658; H04J 3/0667; H04J 3/0697
See application file for complete search history.

(56) References Cited

U.S. PATENT DOCUMENTS

| 10,097,790 | B2 | 10/2018 | Strain | |
| 10,135,601 | B1 | 11/2018 | Beardsley et al. | |
| 2014/0226984 | A1* | 8/2014 | Roberts | H04B 10/27 398/66 |
| 2015/0093109 | A1* | 4/2015 | Joergensen | H04J 14/02 398/45 |
| 2015/0318941 | A1* | 11/2015 | Zheng | H04J 3/0641 370/503 |
| 2017/0032011 | A1* | 2/2017 | Song | G06F 16/25 |
| 2019/0045259 | A1 | 2/2019 | Beardsley et al. | |

* cited by examiner

*Primary Examiner* — Kevin C. Harper
*Assistant Examiner* — Derrick V Rose
(74) *Attorney, Agent, or Firm* — Patterson + Sheridan, LLP (57) ABSTRACT

Embodiments disclosed herein provide techniques to selectively distribute Precision Time Protocol (PTP) data in a network. The network can include multiple different network devices (e.g., switches) connected to form a network architecture (e.g., a spine/leaf architecture). Rather than distributing the PTP data (e.g., PTP timestamps) through all the network devices in order to synchronize local clocks to a global, master clock, the embodiments herein describe an out-of-band distribution network which selectively distributes the PTP data to select network devices in the network.

20 Claims, 5 Drawing Sheets

ROBUST DISTRIBUTION OF IP TIMING SIGNALS

BACKGROUND

Field of the Disclosure

Embodiments disclosed herein relate to selectively distributing Precision Time Protocol (PTP) time reference data in network.

Description of the Related Art

The Precision Time Protocol (PTP) is defined by the Institute of Electrical and Electronics Engineers (IEEE®) 1588 standard and adopted by the Society of Motion Picture and Television Engineers® (SMPTE®) 2059. The PTP standard provides a timestamp that has 80 bits of precision and is accurate to the microsecond range. Generally, SMPTE 2059 is directed to leveraging PTP to provide timestamps for video data that is encapsulated in Internet Protocol (IP) packets. Using these protocols, PTP time reference data can be shared throughout a network to provide a synchronized clock to media nodes (e.g., cameras, audio devices, video encoders, audio encoders, etc.) connected to the network. That is, the switches and other network devices distribute clock signals (e.g., timestamps) that can synchronize local clocks to a master clock.

However, every hop in the network introduces inaccuracy into the PTP signals. That is, even when the switches in the network are PTP-enabled, the switches introduce jitter (e.g., 5-20 nanoseconds) which can reduce the accuracy between a local clock and the master clock. Further, if a path in the network traverses a non-PTP-enabled switch, the jitter or inaccuracy in the PTP signals is increased more, since the non-PTP switch does not account for the transit time. That is, the receiving switches do not know the duration of the transit delay through the non-PTP switch. While this inaccuracy can be mitigated using only PTP-enabled switches, these switches are more expensive. Further, PTP requires frequent communication between the network devices, which can use significant portions of the bandwidth in the network. As networks grow larger, distributing PTP signals throughout the network can be expensive and reduce the available bandwidth in that network. Further larger networks suffer from less accurate clocks signals due to the additive effect of jitter at each of the network switches and inaccuracies discussed above.

SUMMARY

In one embodiment, a network that includes a plurality of PTP-enabled network devices communicatively coupled to a plurality of media nodes, a plurality of non-PTP enabled network devices communicatively coupled to the plurality of PTP-enabled network devices, and an out-of-band PTP distribution network communicatively coupled to the plurality of PTP-enabled network devices. The out-of-band distribution network includes a master clock device configured to generate a master clock and a transparent clock switch where the transparent clock switch is communicatively coupled between the master clock device and the plurality of PTP-enabled network devices. Moreover, the transparent clock switch measures a transit delay, and inserts the transit delay, into PTP packets exchanged between the master clock device and the plurality of PTP-enabled network devices. Further, the plurality of PTP-enabled network devices is configured to transmit only non-PTP signals to the plurality of non-PTP enabled network devices In another embodiment, a method for synchronizing boundary clocks in a plurality of PTP-enabled network devices is described. The method includes receiving, at the plurality PTP-enabled network devices, an announcement from a master clock device were the announcement is received via a transparent clock switch and where the master clock device and the transparent clock switch form an out-of-band PTP distribution network. The method also includes synchronizing the boundary clocks to a master clock generated by the master clock device based on a timestamp of the master clock and a transit delay corresponding to the transparent clock switch, transmitting timestamps of the boundary clocks to media nodes connected to the plurality of PTP-enabled network devices, and transmitting non-PTP data signals from the plurality of PTP-enabled network devices to a plurality of non-PTP enabled network devices.

In still another embodiment, an out-of-band distribution network includes a PTP-enabled network device, a master clock device configured to generate a master clock, and a transparent clock switch communicatively coupled between the master clock device and the PTP-enabled network device. The transparent clock switch measures a transit delay, and inserts the transit delay, into PTP packets exchanged between the master clock device and the PTP-enabled network device. Further, the PTP-enabled network device is communicatively coupled to a non-PTP enabled network device.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide techniques to selectively distribute Precision Time Protocol (PTP) data in a network. The network can include multiple different network devices (e.g., switches) connected to form a network architecture (e.g., a spine/leaf architecture). Rather than distributing the PTP data (e.g., PTP timestamps) through all the network devices in order to synchronize local clocks to a global, master clock, the embodiments herein describe an out-of-band distribution network that selectively distributes the PTP data to select network devices in the network (i.e., a subset of network devices less than a total of all network devices in the network). That is, some of the network devices receive PTP data (which they can use to synchronize local clocks to a master clock) while other network devices do not. The devices connected to the network that rely on the PTP-synchronized clocks (referred to generally as media nodes) are coupled to the network devices coupled to the out-of-band distribution network. Doing so reduces the cost of the switches (since not all of the switches need to be PTP enabled) and increases the accuracy of the PTP timestamps since the PTP packets reach the network devices via the out-of-band distribution network which may have less hops than data paths in a traditional network. Further, enabling a select number of the network devices increases security since doing so provides less access points for an unintended actor (e.g., a nefarious actor, an accidental actor, a rogue actor, etc.) to couple an unapproved device, which the network devices may incorrectly determine is a master clock (and may synch to that clock rather than an authorized master clock).

In one embodiment, the out-of-band distribution network includes multiple master clock devices which independently generate master clocks. The master clock devices may be coupled to transparent clock switches which distribute the master clocks to the network devices in the network selected to receive the PTP signals (referred to herein as boundary clocks). The transparent clock switches are pass through devices that track the transit delays of PTP packets being transferred from the master clock devices to the boundary clocks and vice versa. The out-of-band distribution network can have multiple master clock devices and multiple transparent clock switches to provide redundancy and resiliency. If one of the master clock devices or transparent clock switches fails or is unavailable due to an upgrade or other reason, the boundary clocks can synchronize to another one of the master clocks, or select the master clock signal via a different path through a different one of the transparent clock switches. In one embodiment, the PTP signals are permitted to travel only within the out-of-band distribution network, the network devices with the boundary clocks, and the media nodes coupled to the boundary clocks. For example, the network devices with the boundary clocks may not transmit PTP data to other network devices in the network. Thus, the PTP signals are limited to the selected network devices (which are PTP enabled) and the out-of-band distribution network, which tightly controls the latency and jitter of the PTP signals and minimizes security risk.

Figure 1:
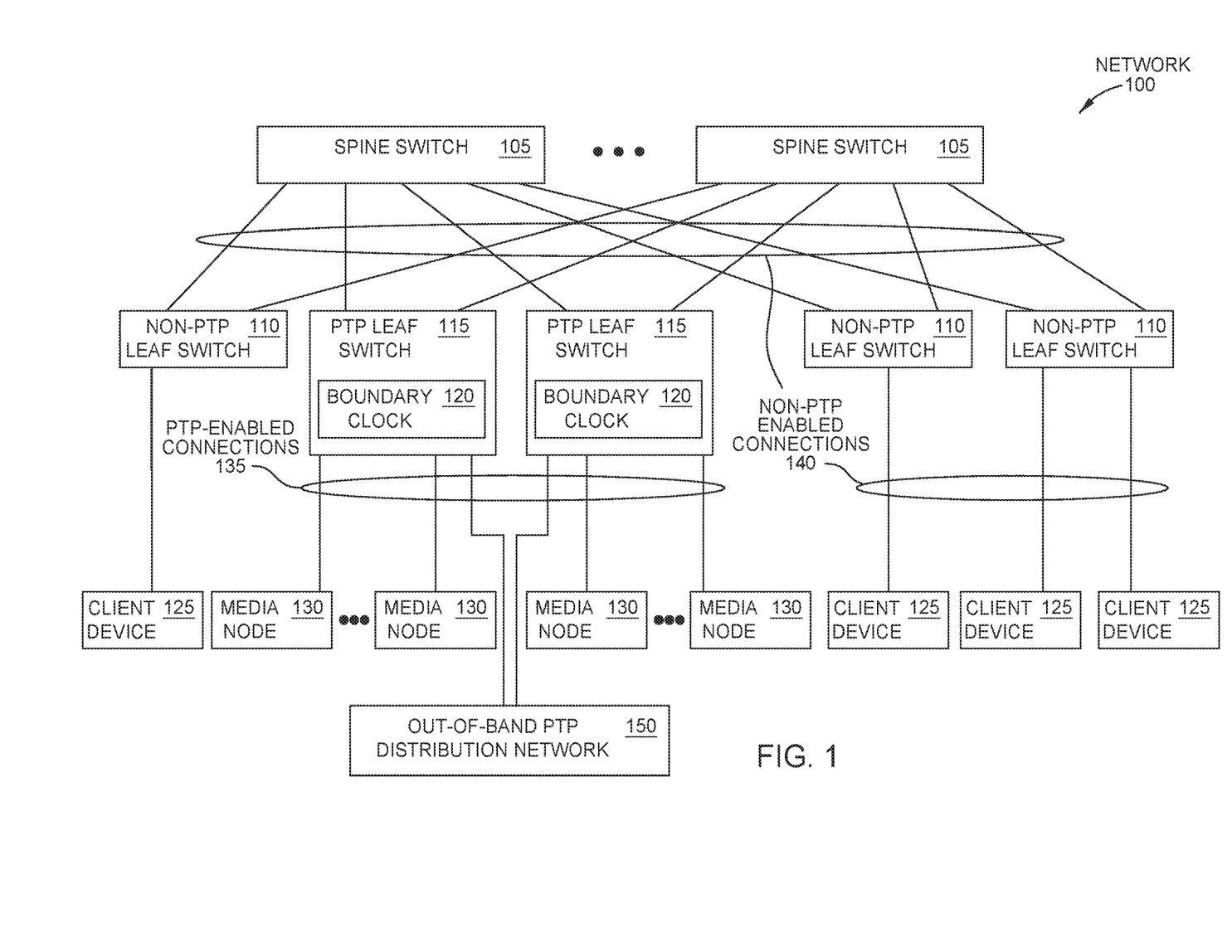
FIG. 1 illustrates selectively distributing PTP signals using an out-of-band distribution network, according to one embodiment.

FIG. 1 illustrates selectively distributing PTP signals using an out-of-band distribution network 150, according to one embodiment. FIG. 1 includes a network 100 with a plurality of network devices—i.e., spine switches 105, non-PTP leaf switches 110 (referred to generally as non-PTP enabled network devices), and PTP-leaf switches 115 (referred to generally as PTP enabled network devices). These network devices provide connectivity to client devices 125 and media nodes 130. The media nodes 130 may be any computing device that uses PTP reference signals to decode or generate IP-based media signals. Some non-limiting examples of media nodes 130 includes cameras, audio recording devices, mixers, video and audio encoders, decoders, and the like. The client devices 125, on the other hand, may be any computing devices that do not rely on the accurate clock signals which PTP provides. Non-limiting examples of client devices 125 include personal computing devices (e.g., laptops or smartphones), servers (e.g., a database server or storage server), or general compute platforms. The spine switches 105 and the leaf switches 110, 115 provide connectivity between the client devices 125 and the media nodes 130 as well as connectivity to other networks (not shown). Further, while the PTP leaf switches 115 are illustrated being coupled to only the media nodes 130, the switches 115 can also be coupled to the client devices 125.

The network 100 in FIG. 1 is arranged in a spine-leaf architecture where every spine switch 105 is coupled to each one of the leaf switches 110, 115. While the leaf switches 110, 115 can have direct connections to each other (which may be useful for backup, redundancy, and failover purposes), generally the leaf switches 110, 115 rely on forwarding data to a spine switch 105 which in turn forwards the data to another one of the leaf switches 110, 115 that is connected to the destination client device 125 or media node 130. Although not shown, the spine switches 105 (or a leaf switch 110, 115) may include connections (e.g., a virtual local access network (VLAN) connection) to a different site that has its own network devices arranged in a spine-leaf architecture.

In FIG. 1, the PTP signals are provided by the out-of-band PTP distribution network 150. However, the out-of-band PTP distribution network 150 is not connected to every one of the switches, but rather is only connected to select ones of the switches—i.e., the PTP leaf switches 115. The out-of-band PTP distribution network 150 is not connected to the non-PTP leaf switches 110. In one embodiment, the non-PTP leaf switches 110 may not be PTP aware. That is, if a non-PTP leaf switch 110 receives a PTP packet, it will forward the packet, but does not track a transit delay associated with processing the packet. In other words, the non-PTP switch 110 treats the PTP packet the same as other data traffic. As a result, downstream network devices do not know the transit delay which reduces the accuracy of the timestamps in the forwarded PTP data. Often, non-PTP leaf switches 110 are less expensive than the PTP leaf switches 115. As a result, by selectively distributing PTP signals (via the out-of-band PTP distribution network 150) to the PTP leaf switches 115 (and not the non-PTP leaf switches 110), the overall cost of the network 100 may be reduced.

In an alternative embodiment, rather than selectively distributing the PTP signals, all the switches (both spine and leaf) may be PTP enabled network devices. In that case, a master clock device is coupled to one of the network devices (either a spine or leaf) and the PTP data can be distributed to all of the network devices. However, this may drive up the cost of network. Further, the accuracy of the PTP data may be reduced relative to the network 100 in FIG. 1. For example, the number of hops between network devices may vary, where each hop adds additional jitter (even when the network devices are all PTP enabled). Thus, media nodes may be plugged into network devices with more hops between a media node and the master clock, thereby reducing the accuracy of the corresponding timestamps. Further, if all the network devices are PTP enabled, someone (either unknowingly or intentionally) may connect an unapproved master clock into one of the network devices. The PTP network devices may synchronize to the unapproved master clock rather than the approved master clock coupled elsewhere to the network. The PTP protocol, as of now, does not include techniques for authorizing master clocks. For example, while the Best Master Clock Algorithm (BMCA) has a method of authorizing a master clock, currently there is no security associated with this algorithm, so there is no method for secure authorization of a master clock By using the out-of-band PTP distribution network 150, these concerns can be mitigated. The overall cost of the network 100 can be reduced, any jitter is tightly controlled, and any security concerns are mitigated due to the fact that the network 100 includes limited PTP leaf switches 115, which makes controlling access to these switches easier.

While FIG. 1 illustrates a spine-leaf architecture, the embodiments herein are not limited to such. The network 100 can include any type of network architecture for coupling together network devices at a site or campus. Put differently, regardless of the specific interconnectivity of the network devices in a network, the out-of-band PTP distribution network 150 can be used to selectively distribute PTP signals to certain network devices (i.e., a subset of network devices less than a total of all network devices in the network). These devices, in turn, can be coupled to media nodes 130 which rely on the PTP data to perform their functions.

Figure 2:
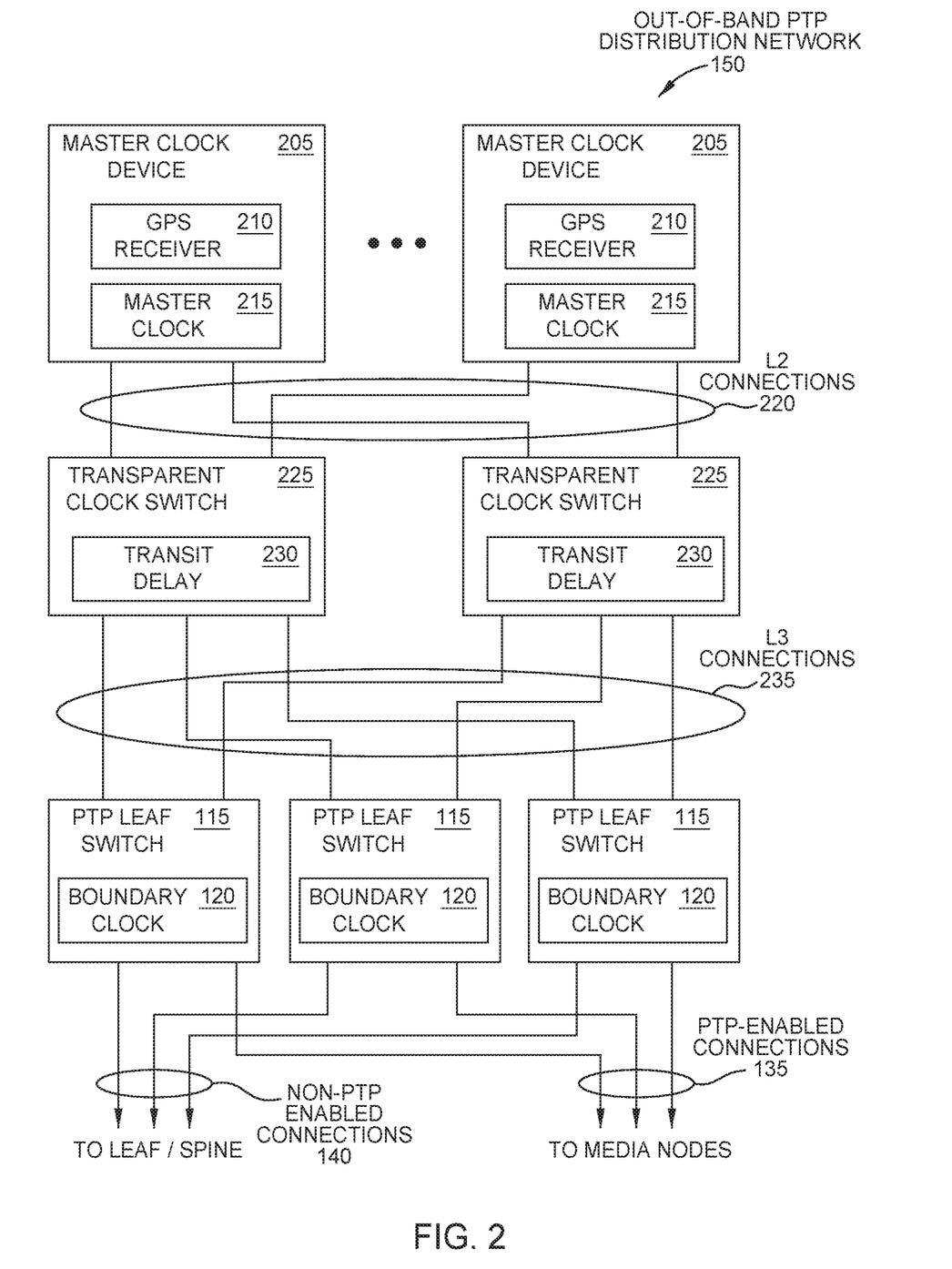
FIG. 2 illustrates an out-of-band distribution network, according to one embodiment.

FIG. 2 illustrates the out-of-band PTP distribution network 150, according to one embodiment. The out-of-band PTP distribution network 150 includes a plurality of master clock devices 205 and a plurality of transparent clock switches 225. For context, FIG. 2 also illustrates the plurality of PTP leaf switches 115 which, in one embodiment, may be considered as part of the out-of-band PTP distribution network 150, as well as part of the data network.

The master clock devices 205 include respective master clocks 215 and a global positioning system (GPS) receiver 210. The master clock devices 205 may be specialized devices for generating PTP data which includes timestamps corresponding to respective master clocks 215. In one embodiment, the master clock devices 205 are appliances designed for PTP applications. The receiver 210 is configured to receive GPS signals which have timestamps (or clock information). The master clock device 205 is configured to then synchronize its master clock 215 to the clock corresponding to GPS. While FIG. 2 illustrates multiple master clock devices 205 in the out-of-band PTP distribution network 150, this is not a requirement. Although one master clock device 205 is sufficient, providing additional master clock devices 205 provides redundancy if one fails, is upgraded, or is otherwise unavailable.

The master clock devices 205 are coupled to transparent clock switches 225. In one embodiment, the transparent clock switches 225 are network devices (while the master clock devices 205 may be an appliance rather than a network device). The transparent clock switches 225 are PTP enabled network devices which distribute the PTP signals generated by the master clock devices 205 to the PTP leaf switches 115. In one embodiment, the transparent clock switches 225 measure a transit delay 230 which is the time it takes for PTP packets to traverse the transparent clock switch 225. This delay 230 may be tracked for packets that are transmitted from the master clock devices 205 to the PTP leaf switches 115 and for packets transmitted from the PTP leaf switches 115 to the master clock devices 205. Before forwarding a PTP packet, the transparent clock switch 225 inserts the transit delay 230 into the packet. That way, downstream devices (e.g., the master clock devices 205 or the PTP leaf switches 115) know the delay 230 incurred when the packet traversed the switch 225. This delay 230 can then be used to more accurately synchronize the boundary clocks 120 in the PTP leaf switches 115 to a master clock 215.

Due to hardware constraints, each of the master clock devices 205 may be configured to communicate with up to two network devices. The transparent clock switches 225 receives the PTP signals from the master clock devices 205 and then distributes the PTP signals to multiple network devices. In FIG. 2, the master clock devices 205 are coupled to both of the transparent clock switches 225. Thus, if one of the transparent clock switches 225 fails, is being upgraded, or is otherwise unavailable, the PTP data can still reach the master clock devices 205 using the other transparent clock switch 225. Thus, while two transparent clock switches 225 are not necessary, having multiple transparent clock switches 225 provides redundancy and failover in the out-of-band PTP distribution network 150. Further, while two transparent clock switches 225 are shown, the out-of-band PTP distribution network 150 can have any number of transparent clock switches assuming the hardware in the master clock devices 205 supports connecting to more network devices.

In one embodiment, the master clock devices 205 do not support Layer 3 (L3) communication. As a result, the out-of-band PTP distribution network 150 includes Layer 2 (L2) connections 220 between the master clock devices 205 and the transparent clock switches 225. However, because the transparent clock switches 225 are network devices, the transparent clock switches 225 can support L3 connections 235 to the PTP leaf switches 115. Using L3 connections 235 permit the transparent clock switches 225 and the PTP leaf switches 115 to control the destination of the PTP signals. In one embodiment, the PTP data is routed as L3 routed multicast data rather than a L2 connection because the PTP data reaches the PTP leaf switches 115 outside of the normal leaf/spine architecture of the network 100 illustrated in FIG. 1. Doing so enables the PTP leaf switches 115 to ensure the PTP signals are routed to the transparent clock switches 225 rather than to other spine or leaf switches in the network. That is, the L3 connections ensure the PTP leaf switches 115 route the PTP data to the transparent clock switches 225 rather than the non-PTP enabled connections 140 to spine or leaf switches that are not PTP enabled. However, the PTP leaf switches 115 can use the non-PTP enabled connections 140 to send/receive non-PTP data to/from the other network devices in the network. Thus, the PTP data can be isolated from the remaining network, or stated differently, the PTP data is limited to the out-of-band PTP distribution network 150 (which can include the PTP leaf switches 115 and the media nodes). Further, the L3 connections 235 may be used for transmitting only PTP data, but not non-PTP data, which is transmitted using the non-PTP enabled connections 140 and the PTP-enabled connections 135. In one embodiment, the PTP multicast and/or unicast address is blocked from the leaf/spine data network 100, even if multicast is enabled on the network 100.

The PTP leaf switches 115 forward the PTP data to the media nodes (which are connected to the switches 115) using the PTP-enabled connections 135. These PTP-enabled connections 135 may be L2 connections since many media nodes do not support L3 communication. Moreover, the PTP leaf switches 115 can also use the PTP-enabled connections 135 to exchange non-PTP data packets with the media nodes. That is, the PTP-enabled connections 135 can transmit both PTP data packets and normal data packets between the PTP leaf switches 115 and the media nodes.

The PTP leaf switches 115 use the PTP data exchanged with the master clock devices 205 to synchronize respective boundary clocks 120 to one of the master clocks 215 in a process that is described in more detail below. In one embodiment, the boundary clocks 120 are servant or slave clocks to the selected master clock 215. The boundary clock 120 may be "syntonized" to the master clock 215. Syntonized is the term used in the IEEE-1588 standard to describe a clock that is held closely in time to another master clock. Synchronized is not used in the IEEE standard as it implies a fully synchronous lock, which is not technically possible in a system without continuous loop feedback between clocks—such as a packet-switched network. In any case, the boundary clocks 120 can be syntonized or synchronized to the master clock 215. Thus, the PTP leaf switches 115 can transmit timestamps generated by their respective boundary clocks 120 to the media nodes which the media nodes can use when performing their IP-based media functions. That is, rather than receiving timestamps directly from the master clock devices 205, the media nodes rely on timestamps generated from the boundary clocks 120 to perform their functions.

Figure 3:
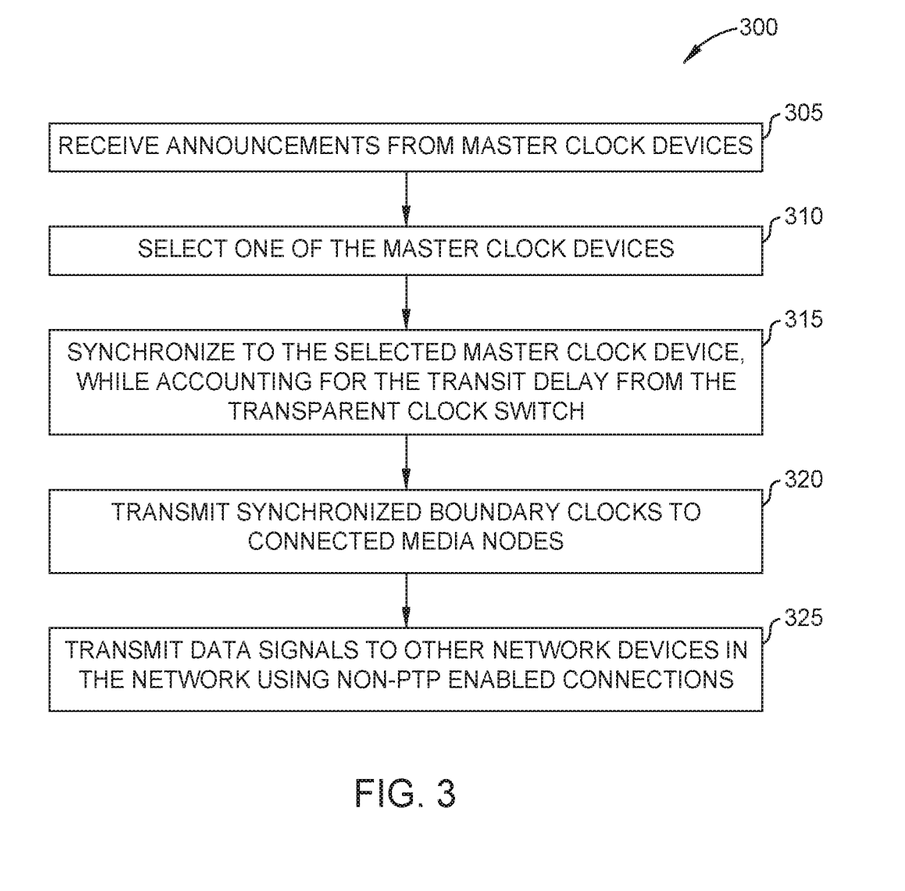
FIG. 3 is a flowchart for synchronizing an out-of-band distribution network with a master clock, according to one embodiment.

FIG. 3 is a flowchart of a method 300 for synchronizing an out-of-band distribution network with a master clock, according to one embodiment. For ease of explanation, the method 300 is discussed in the context of the out-of-band distribution network 150 illustrated in FIG. 2.

At block 305, the PTP leaf switches receive announcements from the master clock devices. As shown in FIG. 2, these announcements may traverse the transparent clock switches. However, rather than synchronizing their local clocks to the master clock, the transparent clock switches instead identify the transit delay associated with the PTP packets and insert this delay into the packets before forwarding the packets. The transparent clock switches can insert this delay for all (or at least a subset) of the packets transmitted through it.

If the out-of-band PTP distribution network includes multiple functioning master clock devices, the PTP leaf switches may receive announcement messages from all the master clock devices. However, with PTP, only one of the master clocks and its corresponding master clock devices is selected as the master clock to which the PTP leaf switches synchronize their boundary clocks.

At block 310, the PTP leaf switches select one of the master clock devices to use when synchronizing their boundary clocks. In one embodiment, the PTP leaf switches use the BMCA to identify the optimal master clock (e.g., a grand master clock) to use for syntonization or synchronization. Regardless of the particular algorithm used, if the PTP leaf switches use the same algorithm, they select the master clock generated by the same master clock device. If no grand master clocks are available, the PTP leaf switches may be preconfigured such that the PTP leaf switches select a predetermined PTP leaf switch as the master clock source.

At block 315, the PTP leaf switches synchronize to the selected master clock device, while accounting for the transit delay introduced by the transparent clock switch used to route data between the PTP leaf switches and the master clock devices. The particular details for synchronizing the boundary clocks to the selected master clock are not provided herein. However, as a brief overview, the PTP leaf switches and the master clock devices may exchange multiple PTP packets that include timestamps generated by the selected master clock and the boundary clocks. Using these timestamps, the PTP leaf switches can determine an offset between the boundary clocks and the selected master clock. The transit delay through the transparent clock switch can also be used when calculating the offset. The offset determined by each PTP leaf switch is then used to synchronize its boundary clock to the selected master clock.

The PTP leaf switches can continue to exchange synchronization data with the selected master device to maintain synchronization. The PTP leaf switches can adjust their boundary clocks (e.g., the servant clocks) to maintain synchronization with the master clock. As mentioned above, these periodic messages can use a significant amount of bandwidth. However, because the PTP traffic is limited or restricted to the out-of-band PTP distribution network, the PTP traffic does not use bandwidth in the portion of the network used to transmit data between the switches. Put differently, the PTP traffic does not use the bandwidth used by other data traffic.

At block 320, the PTP leaf switches transmit the synchronized boundary clock to connected media nodes. That is, now that the boundary clocks in the PTP leaf switches are synchronized to the selected master clock, the media nodes can receive accurate timestamps of the boundary clock which they can use to perform their intended functions (e.g., capturing or editing audio or visual information in a media presentation). Further, the media nodes can rely on timestamps of the boundary clock rather than communicating with the master clock (which may not be able to effectively communicate with a plurality of media nodes).

At block 325, the PTP leaf switches transmit data signals to other network devices in the network using non-PTP enabled connections. That is, in FIG. 2, the PTP leaf switches 115 have both PTP-enabled connections 135, which transmit both normal data traffic and PTP traffic to the media nodes, as well as non-PTP connections 140, which are used to transmit non-PTP data (e.g., all other data traffic besides PTP) to the spine and leaf switches in the network.

Figure 4:
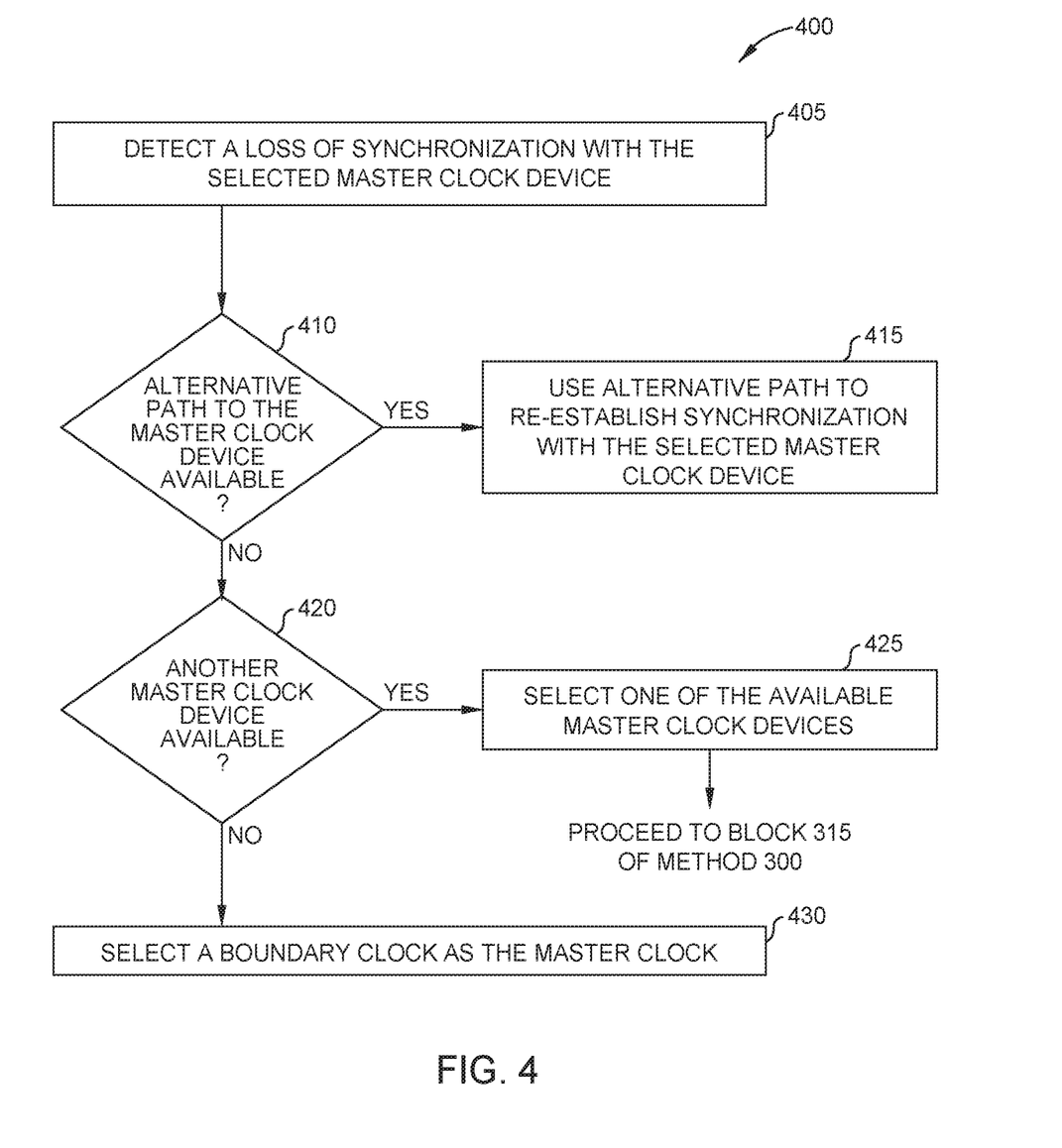
FIG. 4 is a flowchart for recovering from lost synchronization in an out-of-band distribution network, according to one embodiment.

FIG. 4 is a flowchart of a method 400 for recovering from lost synchronization in an out-of-band distribution network, according to one embodiment. At block 405, a PTP leaf switch detects a loss of synchronization with the selected master clock device. This may occur when a master clock device fails or is being upgraded. Further, a loss of synchronization may occur when a transparent clock switch fails or is being upgraded.

At block 410, the out-of-band distribution network determines whether an alternative path to the master clock is available. For example, the out-of-band PTP distribution network may include multiple transparent clock switches that provide redundant, failover paths to the master clock devices. If one of the transparent clock switches fails, the data traffic can automatically failover to another transparent clock switch, which provides an alternative path.

Assuming an alternative path is available, at block 415, the PTP leaf switch (or switches) use the alternative path to re-establish synchronization with the selected master clock device. For example, the PTP packets can automatically begin using the redundant transparent clock switch to exchange synch data with the selected master device.

However, if the selected master device fails or is otherwise unavailable, there may not be an alternative path. In that case, the method 400 proceeds to block 420 where the PTP leaf switches determine whether another master clock device is available. For example, the out-of-band PTP distribution network may include multiple master clock devices which have independent master clocks. If the selected master clock fails, the PTP leaf switches can synchronize with one of the other master clock devices. In that case, the method 400 proceeds to block 425 where the PTP leaf switches select one of the available master clock devices. The PTP leaf switches can use the same techniques described above in FIG. 3 to select a master clock—e.g., BMCA. The method 400 can then proceed to block 315 of method 300 to synchronize the PTP leaf switches to the newly selected master clock device.

However, if there are no available master clocks (e.g., the out-of-band PTP distribution network may have only one master clock, or all the master clocks devices may have failed), the method 400 proceeds to block 430 where the PTP leaf switches select a boundary clock as the master clock. In this example, the boundary clock in one of the PTP leaf switches is selected as the master clock to which the other PTP leaf switches synchronize. That way, all of the media nodes can continue to receive timestamps from the same master clock, which they can use to perform their respective functions.

Figure 5:
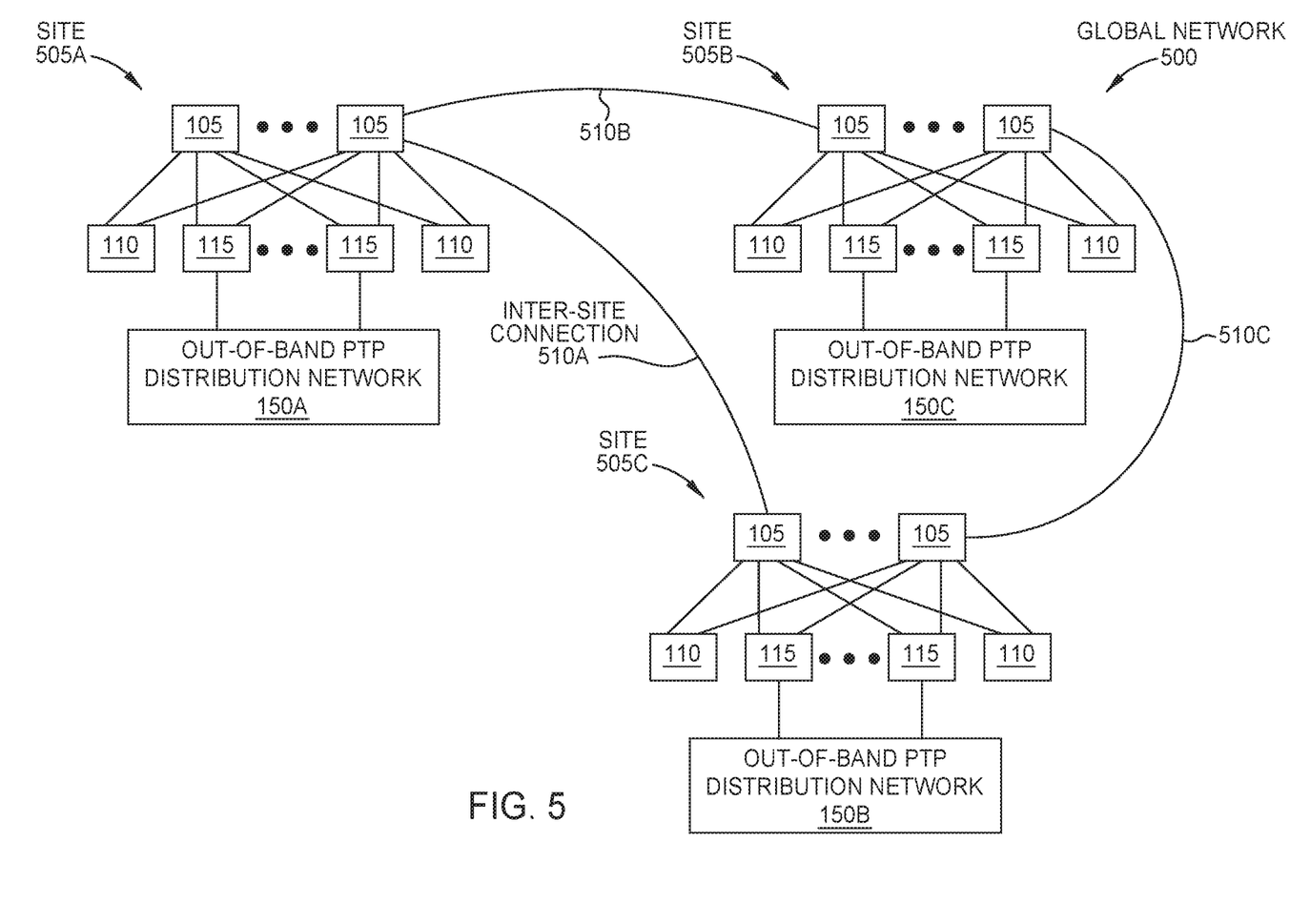
FIG. 5 illustrates multiple sites with respective out-of-band distribution networks, according to one embodiment.

FIG. 5 illustrates multiple sites with respective out-of-band distribution networks, according to one embodiment. In one embodiment, the three sites 505A-505C illustrated in FIG. 5 can form a single network that is communicatively coupled by inter-site connections 510A-510C. For example, the sites 505A-505C may form a private network by which the sites 505A-505C can communicate without traversing a public network. To do so, the inter-site connections 510A-510C may be virtual local access network (VLAN) connections that encrypt or segregate the data traffic exchanged by the sites 505A-505C. In one embodiment, the sites 505A-505C and the inter-site connections 510A-510C may form the private network for an entity such as a company that has local resources (e.g., the switches 105, 110, and 115) at different geographic locations (e.g., Los Angeles, New York, and London). However, in another embodiment, the sites 505A-505C may be different networks that rely on a public network (e.g., the Internet) to exchange data.

As shown, each site 505A, 505B, 505C has its own respective out-of-band distribution network 150A, 150B, 150C. While it may be possible to have one out-of-band distribution network and distribute the PTP signals a plurality of sites, as discussed above, this adds jitter and inaccuracies, and also may require that all the switches are PTP enabled for achieving accurate PTP synchronization. Instead, in FIG. 5, each site 505A, 505B, 505C has its own respective out-of-band PTP distribution network 150A, 150B, 150C that selectively exchanges PTP synch data only with the PTP leaf switches 115, rather than all the leaf switches in the sites 505A, 505B, 505C. Doing so ensures the media nodes at each site 505A-505C have more accurate PTP signals (relative to distributing the PTP signals using the inter-site connections 510A-510C), can reduce overall costs since not all of the leaf switches and spine switches need to be PTP enables, and can improve security. In this example, the out-of-band PTP distribution network 150A provides PTP signals only for the PTP leaf switches 115 at the site 505A, the out-of-band PTP distribution network 150B provides PTP signals only for the PTP leaf switches 115 at the site 505B, and the out-of-band PTP distribution network 150C provides PTP signals only for the PTP leaf switches 115 at the site 505C.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A network, comprising:
a plurality of Precision Time Protocol (PTP)-enabled switches communicatively coupled to a plurality of media nodes;
a plurality of non-PTP-enabled switches communicatively coupled to the plurality of PTP-enabled switches; and
an out-of-band PTP distribution network communicatively coupled to the plurality of PTP-enabled switches, the out-of-band PTP distribution network comprising:
a master clock device configured to generate a master clock, and
a transparent clock switch, wherein the transparent clock switch is communicatively coupled between the master clock device and the plurality of PTP-enabled switches, wherein the transparent clock switch measures a transit delay, and inserts the transit delay, into PTP packets exchanged between the master clock device and the plurality of PTP-enabled switches,
wherein the plurality of PTP-enabled switches is configured to transmit only non-PTP signals to the plurality of non-PTP-enabled switches.

2. The network of claim 1, wherein the out-of-band PTP distribution network comprises:
a plurality of master clock devices, each generating an independent master clock; and
a plurality of transparent clock switches, wherein each of the plurality of transparent clock switches is communicatively coupled to each of the plurality of master clock devices and each of the plurality of PTP-enabled switches, wherein the plurality of transparent clock switches serves as a backup to each other.

3. The network of claim 1, further comprising:
a plurality of spine switches, wherein the pluralities of PTP- and non-PTP-enabled switches are leaf switches, wherein the plurality of spine switches is non-PTP-enabled.

4. The network of claim 3, wherein the plurality of spine switches exchange only non-PTP packets with the plurality of PTP-enabled switches.

5. The network of claim 3, further comprising a plurality of PTP connections and a plurality of non-PTP connections, wherein the plurality of PTP-enabled switches are configured to use the PTP connections to communicate with the transparent clock switch and the media nodes, and to use the non-PTP connections to communicate with the plurality of non-PTP-enabled switches and the plurality of spine switches.

6. The network of claim 1, wherein the plurality of PTP-enabled switches use at least Layer 3 routing to transmit the PTP packets to the transparent clock switch.

7. The network of claim 1, wherein the master clock device comprises a global positioning system (GPS) receiver for generating the master clock and the plurality of PTP-enabled switches comprise respective boundary clocks configured to synchronize to the master clock using the PTP packets.

8. An out-of-band distribution network, comprising:
a PTP-enabled switch;
a master clock device configured to generate a master clock; and
a transparent clock switch communicatively coupled between the master clock device and the PTP-enabled switch, wherein the transparent clock switch measures a transit delay, and inserts the transit delay, into PTP packets exchanged between the master clock device and the PTP-enabled switch,
wherein the PTP-enabled switch is communicatively coupled to a non-PTP-enabled switch and transmits only non-PTP traffic to the non-PTP-enabled switch.

9. The out-of-band distribution network of claim 8, further comprising:
a plurality of master clock devices, each generating an independent master clock; and
a plurality of transparent clock switches, wherein each of the plurality of transparent clock switches is communicatively coupled to each of the plurality of master clock devices and the PTP-enabled switch, wherein the plurality of transparent clock switches serves as backups to each other.

10. The out-of-band distribution network of claim 8, wherein the PTP-enabled switch is communicatively coupled to a plurality of spine switches, wherein the PTP-enabled switch is leaf switch, wherein the plurality of spine switches is non-PTP-enabled.

11. The out-of-band distribution network of claim 10, wherein the plurality of spine switches exchange only non-PTP packets with the PTP-enabled switch.

12. The out-of-band distribution network of claim 10, wherein the PTP-enabled switch uses a plurality of PTP connections to communicate with the transparent clock switch and media nodes but uses non-PTP connections to communicate with the non-PTP-enabled switch and the plurality of spine switches.

13. The out-of-band distribution network of claim 8, wherein the PTP-enabled switch uses at least Layer 3 routing to transmit the PTP packets to the transparent clock switch.

14. A method, comprising:
providing a plurality of Precision Time Protocol (PTP)-enabled switches communicatively coupled to a plurality of media nodes and a plurality of non-PTP-enabled switches communicatively coupled to the plurality of PTP-enabled switches;
providing an out-of-band PTP distribution network communicatively coupled to the plurality of PTP-enabled switches, the out-of-band PTP distribution network comprising a master clock device configured to generate a master clock and a transparent clock switch, wherein the transparent clock switch is communicatively coupled between the master clock device and the plurality of PTP-enabled switches;
measuring a transit delay using the transparent clock switch;
inserting, using the transparent clock switch, the transit delay into PTP packets exchanged between the master clock device and the plurality of PTP-enabled switches; and
transmitting only non-PTP signals from the plurality of PTP-enabled switches to the plurality of non-PTP-enabled switches.

15. The method of claim 14, wherein the out-of-band PTP distribution network comprises a plurality of master clock devices and a plurality of transparent clock switches, the method further comprising:
generating an independent master clock using each of the plurality of master clock devices; and
operating the plurality of transparent clock switches as a backup to each other.

16. The method of claim 14, further comprising:
providing a plurality of spine switches, wherein the plurality of PTP-enabled switches and the plurality of non-PTP-enabled switches are leaf switches, wherein the plurality of spine switches is non-PTP-enabled.

17. The method of claim 16, further comprising:
exchanging only non-PTP packets between the plurality of spine switches and the plurality of PTP-enabled switches.

18. The method of claim 16, further comprising:
providing a plurality of PTP connections and a plurality of non-PTP connections;
using the PTP connections to communicate between the plurality of PTP-enabled switches and the transparent clock switch and between the plurality of PTP-enabled switches and the media nodes; and
using the non-PTP connections to communicate between the plurality of PTP-enabled switches and the plurality of non-PTP-enabled switches and between the plurality of PTP-enabled switches and the plurality of spine switches.

19. The method of claim 14, further comprising:
transmitting the PTP packets from the plurality of PTP-enabled switches to the transparent clock switch using at least Layer 3 routing.

20. The method of claim 14, further comprising:
generating the master clock using a global positioning system (GPS) receiver in the master clock device; and
synchronizing respective boundary clocks in the plurality of PTP-enabled switches to the master clock using the PTP packets.

* * * * *